United States Patent
Belikov et al.

(10) Patent No.: US 7,050,235 B2
(45) Date of Patent: May 23, 2006

(54) DIFFRACTIVE OPTICAL SPECTRAL FILTER HAVING ARBITRARY AMPLITUDE AND PHASE RESPONSE

(75) Inventors: Ruslan Belikov, Plainsboro, NJ (US); Olav Solgaard, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/062,781

(22) Filed: Feb. 22, 2005

(65) Prior Publication Data

US 2006/0082883 A1    Apr. 20, 2006

Related U.S. Application Data

(60) Provisional application No. 60/547,278, filed on Feb. 23, 2004.

(51) Int. Cl.
    *G02B 27/46* (2006.01)
(52) U.S. Cl. .................... 359/559; 359/223; 359/558
(58) Field of Classification Search ........ 359/558–563, 359/223–224
    See application file for complete search history.

(56) References Cited

U.S. PATENT DOCUMENTS

| 5,757,536 A | 5/1998 | Ricco et al. ............... 359/224 |
| 5,905,571 A | 5/1999 | Butler et al. ............... 356/328 |
| 6,362,879 B1 | 3/2002 | Ranalli ....................... 356/328 |
| 6,469,827 B1 * | 10/2002 | Sweatt et al. ............. 359/351 |
| 2004/0145810 A1 | 7/2004 | Ranalli ....................... 356/569 |

* cited by examiner

*Primary Examiner*—John D. Lee
(74) *Attorney, Agent, or Firm*—Lumen Intellectual Property Services, Inc.

(57) ABSTRACT

A diffractive optical filter having a fractional level density $s[j]$ and a transfer function $C[m]$ that is an approximation to a desired Hermitian, passive transfer function $B[m]$ is provided. The fractional level density $s[j]$ is obtained by Fourier (or inverse Fourier) transforming $B[m]$ to obtain $t[j]$, calculating $u[j]=t[j]-\min(t[j])$, calculating $v[j]=u[j]/D$ where $D$ is the sum of $u[j]$ over $j$, and setting $s[j]$ substantially equal to $v[j]$. A 2-D tiltable mirror array can be used to provide a 1024 tap optical filter having 10-bit tap resolution. Applications of the invention include laser tuning elements, spectroscopy and wavelength-division multiplexing, switching, and/or filtering.

21 Claims, 5 Drawing Sheets

DIFFRACTIVE OPTICAL SPECTRAL FILTER HAVING ARBITRARY AMPLITUDE AND PHASE RESPONSE

CROSS REFERENCE TO RELATED APPLICATIONS

This application claims the benefit of U.S. Provisional Application 60/547,278, filed on Feb. 23, 2004, entitled "Diffractive Optical Spectral Filter having Arbitrary Amplitude and Phase Response", and incorporated herein by reference in its entirety.

GOVERNMENT SPONSORSHIP

This invention was made with support from the Air Force Office of Scientific Research, under grant number F49620-00-C-0040. The Government has certain rights in this invention.

FIELD OF THE INVENTION

This invention relates to optical spectral filtering.

BACKGROUND

Optical spectral filters provide a frequency dependent optical response, such as reflectance or transmittance. Glass filters and thin film interference filters are two well-known approaches for providing optical spectral filters, but the design flexibility provided by these approaches is limited. In particular, design of such filters having arbitrary amplitude and phase response is typically difficult, if not impossible. An alternative approach that provides such design flexibility is to use a dispersive element to separate optical frequencies, followed by one or more filtering elements acting on the individual dispersed frequencies to alter amplitude and/or phase, and a combining element to recombine the filtered frequencies. However, this approach is complex and expensive to implement.

Another approach for optical spectral filtering is the use of a single diffractive surface having adjustable surface elements, e.g. as considered in U.S. Pat. No. 5,905,571 to Butler et al. However, in this reference the only method disclosed for positioning elements of the diffractive surface to provide a desired spectral response is an iterative numerical method, and it is therefore time consuming to change the desired spectral response during operation. Furthermore, the disclosed method does not allow independent specification of desired amplitude and phase responses.

Optical filter design is also considered in U.S. patent application 2004/0145810 to Ranalli. In this work, a Fourier transform of the desired spectral response is computed to derive an impulse response, which is then implemented by adjusting the width and depth of grating lines to set the impulse response amplitude and phase respectively. This work does not address how to make such filters tunable or electrically controllable. It also requires each grating line width and depth to be set individually and precisely to the required values, which tends to complicate fabrication.

Accordingly, it would be an advance in the art to provide a diffractive surface optical spectral filter having surface elements positioned according to a deterministic algorithm for providing a desired amplitude and phase response. A further advance in the art would be such a filter having electrical controllability or tunability, and having simple fabrication.

SUMMARY

An embodiment of the present invention is a diffractive optical filter having a discrete fractional level density s[j] and a discrete transfer function C[m] that is an approximation to a desired Hermitian, passive, discrete transfer function B[m]. Such discrete transfer functions can be discrete approximations to continuous transfer functions. The fractional level density s[j] is obtained by Fourier (or inverse Fourier) transforming B[m] to obtain t[j], calculating u[j]=t[j]−min(t[j]), calculating v[j]=u[j]/D where D is the sum of u[j] over j, and setting s[j] substantially equal to v[j]. A preferred embodiment of the invention makes use of a 2-D tiltable mirror array to provide a 1024 tap optical filter having 10-bit tap resolution. Applications of the present invention include laser tuning elements, picosecond or femtosecond laser pulse shaping, spectroscopy and wavelength-division multiplexing (WDM) switching, channel mixing, and/or filtering.

DETAILED DESCRIPTION

Figure 1:
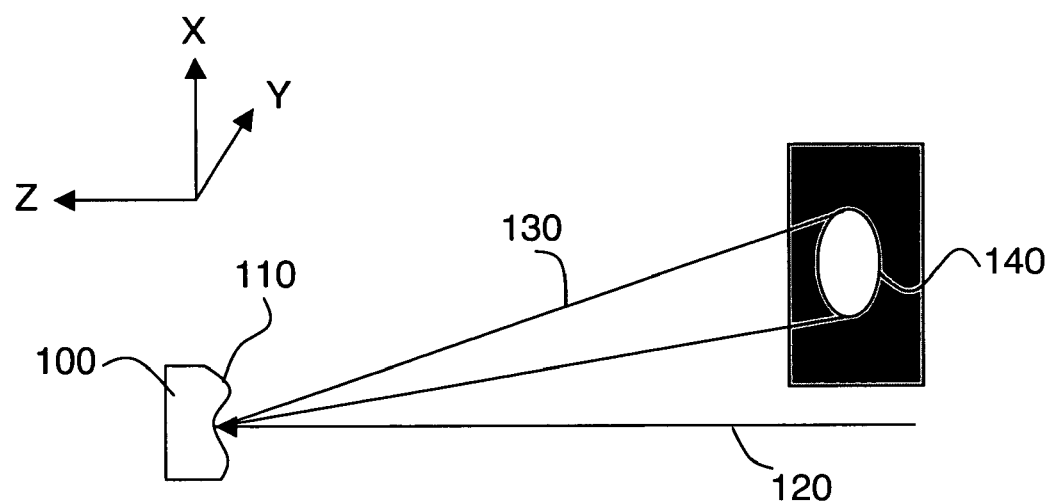
FIG. 1 shows far field filtering from a diffractive surface in accordance with an embodiment of the invention.

FIG. 1 shows far field filtering from a diffractive surface in accordance with an embodiment of the invention. A diffractive optical element 100 has a diffractive surface 110, and is illuminated by a z-directed plane wave 120. A far-field aperture 140 defines a narrow range of diffraction angles 130. Light diffracted into angular region 130 by surface 110 is the output of a filter formed by surface 110 and aperture 140. This filter has a power transfer function T(k) between input (i.e., plane wave 120) and output given by $$T(k) = |A(k)|^2 \frac{S}{\lambda^2} \delta\Omega \qquad (1)$$

where $\delta\Omega$ is the solid angle subtended by aperture 140, S is the area of surface 110 that is illuminated, $k=2\pi/\lambda$ and $\lambda$ is the free space optical wavelength of plane wave 120.

In Eq. 1, the normalized filter transfer function A(k) is introduced, which is given by $$A(k) = \frac{1}{S} \int_S \exp[-j2kh(\rho)]\exp(-jk\Omega \cdot \rho) d\rho \qquad (2)$$

where $\rho$ is a 2-D vector in the x-y plane, $h(\rho)$ is the height of surface 110 as a function of position in the X-Y plane, and $\Omega$ is a vector having components (x0/z0, y0/z0) where (x0, y0, z0) are the coordinates of the center of aperture 140.

Here the origin of the coordinate system is taken to lie on surface 110. A(k) is a complex-valued function of k.

The results given in Eqs. 1 and 2 are approximations which are valid if the following conditions are satisfied: 1) light incident on surface 110 is a monochromatic z-directed plane wave, or is a distribution of such waves all having the same polarization, thus allowing the use of scalar diffraction theory; 2) surface 110 imposes a position-dependent phase shift of 2 kh(ρ) on each incident wave; 3) aperture 140 is within a far-field region, in which the Fraunhofer approximation is valid; 4) aperture 140 captures a small cone of light δΩ across which the optical intensity is nearly constant, and aperture 140 is positioned close to the z axis (i.e., the components of Ω are small). The far-field regime of condition 3 above can be created in various ways, such as by propagation a long distance from surface 110, or by propagation through a lens or other imaging system which forms a far-field regime at a selectable and finite distance from surface 110. Thus, any region where the Fraunhofer approximation is valid is referred to as a "far-field" or "diffractive far-field" region, independently of how this condition is achieved in practice. For example, the Fourier plane of a lens or mirror is a "far-field" region.

Although Eqs. 1 and 2 give T(k) and A(k) in terms of h(ρ), inversion of these equations to determine h(ρ) given T(k) or A(k) is not straightforward. For example, as indicated above, iterative numerical methods have been employed to perform this inversion. The approach taken here is to develop an analytic solution to this inversion problem that provides an approximate result in closed form.

In Equation 2, Ω can be set equal to zero without loss of generality, since Ω can be absorbed into the definition of h(ρ) by the transformation h(ρ)⇒h(ρ)+Ω·ρ/2. Furthermore, a change of variables in Eq. 2 gives $$A(k) = \int_0^{\Delta h} s(z) \exp[-j2kz] dz \quad (3)$$

where s(z) is the fractional level density of h(ρ) (i.e., s(z)dz is the fraction of S having a height h(ρ) in the range z<h(ρ)<z+dz). Any realizable device will have a finite range of heights Δh, and so we have taken $0 \leq h(\rho) \leq \Delta h$ in Eq. 3 without loss of generality. The parameterization of Eq. 3 is convenient, because the 2-D integration of Eq. 2 is replaced with the 1-D integration of Eq. 3. This approach allows surfaces varying along only one dimension and surfaces varying along two dimensions to be treated on an equal footing. Furthermore, Eq. 3 shows that changing the area S has no effect on A(k), and that any two different h(ρ) having the same s(z) will have the same A(k).

Given s(z) we can calculate $$f(x) = \int_{-\infty}^{x} s(z) dz$$

$$h_1(\rho) = f^{-1}(x) \quad (4)$$

to calculate a surface profile $h_1(\rho)$ having the given s(z). The one-dimensionally varying $h_1(\rho)$ of Eq. 4 is equivalent to any other h(ρ) having the same s(z). Since Eqs. 4 explicitly give an $h_1(\rho)$ corresponding to an arbitrary s(z), the inversion of Eqs. 1 and 2 to find h(ρ) is reduced to determining s(z) given A(k) in Eq. 3.

In Eq. 3, s(z) and A(k) are a Fourier transform pair. However, inversion of Eq. 3 to obtain s(z) in terms of A(k) cannot be accomplished by simply taking a Fourier (or inverse Fourier) transform of an arbitrary A(k). The reason for this is that s(z) has the following three properties: s(z) is real valued, s(z) integrates to unity, and $s(z) \geq 0$ for all z. These three properties all follow from the definition of s(z). A function A(k) that is a Fourier (or inverse Fourier) transform of such an s(z) in Eq. 3 is referred to as an "allowed" transfer function.

The transfer function A(k) in Eq. 3 has the following three properties:

$$A(-k) = A^*(k),$$

$$A(0) = 1,$$

$$|A(k)| \leq 1. \quad (5)$$

A(k) is Hermitian (i.e., $A(-k) = A^*(k)$) because s(z) is real. A(0)=1 because s(z) integrates to unity. A(k) is passive (i.e., $|A(k)| \leq 1$) because $s(z) \geq 0$ and s(z) integrates to unity. Although the conditions of Eq. 5 are necessary for A(k) to be allowable, they are not sufficient.

However, given any B(k) that satisfies the conditions of Eq. 5, an allowed transfer function C(k) that is an approximation to B(k) can be obtained via the following procedure: 1) calculate t(z) such that t(z) and B(k) are a Fourier transform pair (i.e., t(z) is a Fourier (or inverse Fourier) transform of B(k)); 2) calculate $t_{min}$ equal to the minimum value of t(z) as z is varied; 3) calculate $u(z) = t(z) - t_{min}$; 4) calculate D equal to the integral of u(z) over all z; 5) calculate v(z)=u(z)/D; and 6) calculate C(k) such that v(z) and C(k) are a Fourier transform pair.

Since B(k) is Hermitian, t(z) is a real-valued function of z. By construction, $u(z) \geq 0$, $v(z) \geq 0$, and the integral of v(z) over z is unity. Thus v(z) satisfies the required conditions for s(z) in Eq. 3, thereby making C(k) an allowed transfer function. The function C(k)=B(k)/D except at k=0, where C(0)=1. Thus for all nonzero k, C(k) and B(k) are related by a scale factor D. Therefore, a scaled approximate realization of a desired transfer function B(k) according to the present invention is provided by a diffractive surface having level density v(z) as calculated above. The resulting filter transfer function C(k)=B(k)/D, except at k=0, where C(0)=1. The level density v(z) required to provide C(k) is obtained from a non-iterative calculation.

The above description of the calculation of v(z) is based on a continuous formalism. A preferred embodiment of the invention makes use of a diffractive surface having discretely spaced heights. Therefore, a discrete formalism corresponding to the above continuous formalism is also of interest. Let A[m]=A(k0+mδk) and let s[j]=s(jδh)δh, where δk is a bandwidth resolution, δh is a height resolution, and the indices j and m run from 0 to N−1. Thus A[m] and s[j] are N point discretizations of A(k) and s(z) respectively. The filter bandwidth Δk=N δk and the height range Δh=N δh. From Eq. 3, it is apparent that A[m] and s[j] are a discrete Fourier transform pair. Therefore, we have $$\Delta k = \frac{\pi}{\delta h},$$

$$\delta k = \frac{\pi}{\Delta h}, \quad (6)$$

relating resolutions (i.e., δk and δh) to "bandwidths" (i.e., Δk and Δh). The discrete fractional level density s[j] satisfies the following conditions: s[j] is real, the sum of s[j] for all j is unity, and $s[j] \geq 0$.

The discrete transfer function A[m] has the following three properties:

$$A[N-m] = A^*[m],$$

$$A[0] = 1,$$

$$|A[m]| \leq 1. \tag{7}$$

analogous to the properties given in Eq. 5 for A(k). Although the conditions of Eq. 7 are necessary for A[m] to be allowable, they are not sufficient.

However, given any B[m] that satisfies the conditions of Eq. 7, an allowed discrete transfer function C[m] that is an approximation to B[m] can be obtained via the following procedure: 1) calculate t[j] such that t[j] and B[m] are a discrete Fourier transform pair (i.e., t[j] is a discrete Fourier (or inverse Fourier) transform of B[m]); 2) calculate $t_{min}$ equal to the minimum value of t[j] as j is varied; 3) calculate $u[j] = t[j] - t_{min}$; 4) calculate D equal to the sum of u[j] over all j; 5) calculate v[j] = u[j]/D; and 6) calculate C[m] such that v[j] and C[m] are a discrete Fourier transform pair. The resulting filter transfer function C[m]=B[m]/D, except at m=0, where C[0]=1. The level density v[j] required to provide C[m] according to the invention is obtained from a non-iterative calculation. As expected, this procedure is analogous to the procedure discussed above for continuous s(z) and A(k).

Figure 2:
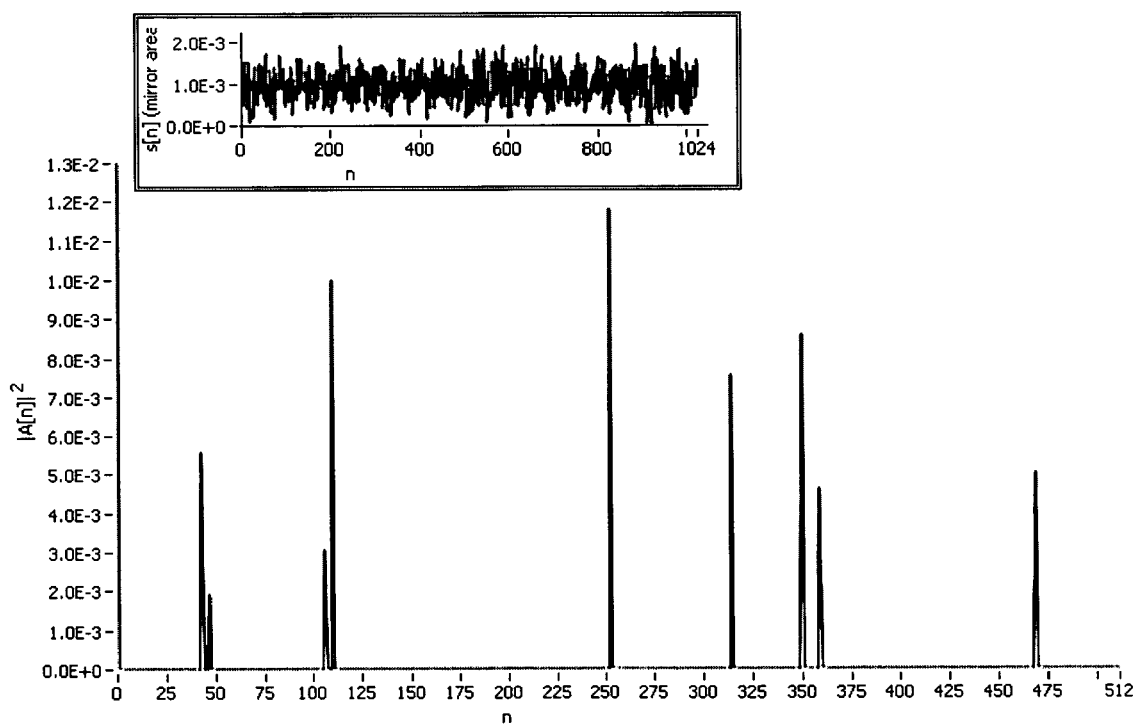
FIG. 2 shows an approximate power spectrum in accordance with an embodiment of the invention.

FIG. 2 shows an example of discrete filter synthesis according to the invention. In this example, a desired filter was constructed having 10 randomly placed peaks with random amplitudes. Since N=1024 points were used, the peaks were restricted to points between 0 and 512 due to Hermitian symmetry as in Eq. 7. Following the above procedure, a discrete fractional level density (s[n] on the inset of FIG. 2) was calculated. As shown on FIG. 2, s[n] is real, non-negative, and sums to unity. The intensity response $|A[n]|^2$ of the filter provided by s[n] is shown on FIG. 2, and replicates the original random pattern of peaks, except for attenuation by an overall scale factor. On FIG. 2 there are three closely spaced peaks between n=25 and n=50, so 10 peaks are indeed present on FIG. 2. The peak in A[n] at n=0 is not shown on FIG. 2.

Figure 3:
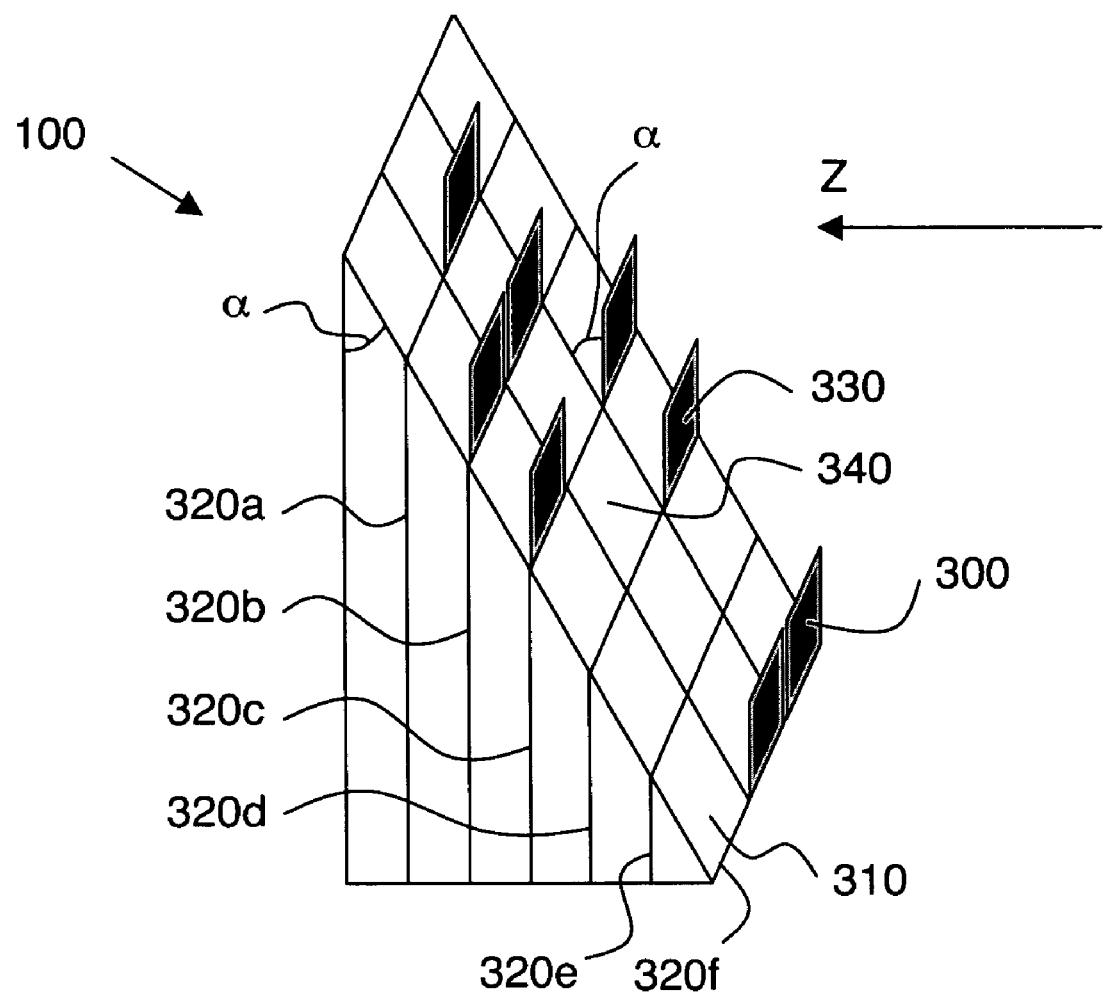
FIG. 3 shows a diffractive surface in accordance with an embodiment of the invention.

FIG. 3 shows a preferred diffractive element 100 for practicing the invention, which is a 2-D array of two-state tiltable mirrors. Such mirror arrays are commercially available, e.g., from Texas Instruments. Pixel 300 is in a state where it provides normal (or near-normal) reflectivity to a z-directed optical wave. Thus light reflected from pixel 300 contributes to the far field at aperture 140 on FIG. 1. Pixel 310 is in a state where it does not provide such reflectivity to a z-directed optical wave. Thus light reflected from pixel 310 does not contribute to the far field at aperture 140 on FIG. 1. A pixel is switched between the states of pixels 300 and 310 (or vice versa) by tilting a mirror by a tilt angle α about an edge of the mirror, as shown. Preferably this switching is under electrical control, as in various commercially available devices. A typical value of α is 12 degrees, which is sufficiently large to ensure that light reflected from pixels such as 310 does not contribute to the near z-axis far field.

The surface of diffractive element 100 on FIG. 3 is tilted with respect to the z axis by the angle α, as shown. Thus each row of pixels has a different height h, and the heights of adjacent rows are separated by the height resolution δh. For example, pixels 300 and 310 are in the same row 320f having height h0. Rows 320e, 320d, 320c, 320b and 320a have corresponding heights h0−δh, h0−2δh, h0−3δh, h0−4δh, and h0−5δh. For a tilt angle α of 12 degrees, and a pixel size of 20 μm (both values being typical for commercial devices), the resulting δh is 4.16 μm.

Pixels such as 310 and 340 which are not oriented to provide near-normal reflection do not contribute to the filter response. Therefore, the diffractive surface S defined by element 100 of FIG. 3 includes all and only those pixels, such as 300 and 330, which are oriented to provide near-normal reflectivity. Thus, in the example of FIG. 3, we have the following values of discrete fractional level density, where the height reference is now taken to be the height of row 320a:

$$s[0] = 0.125,$$

$$s[1] = 0.25,$$

$$s[2] = 0.25,$$

$$s[3] = 0.125,$$

$$s[4] = 0.0,$$

$$s[5] = 0.25. \tag{8}$$

Note that the arrangement of pixels within rows is irrelevant. For example, rows 0 and 3 each have one active pixel, and that is all that matters. The different position of the active pixels in rows 0 and 3 does not affect filter performance.

Mirror arrays suitable for use with the present invention need not have the exact configuration of FIG. 3. However, preferred mirror arrays will have mirrors which can be electrically switched to either of two positions: a first position directing incident light toward an output aperture and a second position directing incident light away from the output aperture. Preferred mirror arrays will also have mirrors which are divided into sets of mirrors having equally spaced heights (i.e., separated by a constant spacing δh). Such mirror arrays are commercially available, and can be fabricated with micro electro-mechanical systems (MEMS) technology.

Commercially available mirror array devices can provide a very large number of pixels, e.g., a 1024 by 1024 array. Such an array can be thought of as providing a finite impulse response (FIR) optical filter having 1024 taps, each of these taps having a non-negative tap weight with 10-bit resolution. For δh=4.16 μm as calculated above and N=1024, such a filter will provide 0.24 nm resolution over an optical bandwidth of 240 nm near λ=1 μm, from Eq. 6. More generally, the number of illuminated rows on FIG. 3 gives the number of taps, while log (base 2) of the number of illuminated pixels per row gives the tap resolution in bits. The present invention provides an efficient way to exploit this enormous design flexibility to provide optical filters having desired transfer functions.

Figure 4:
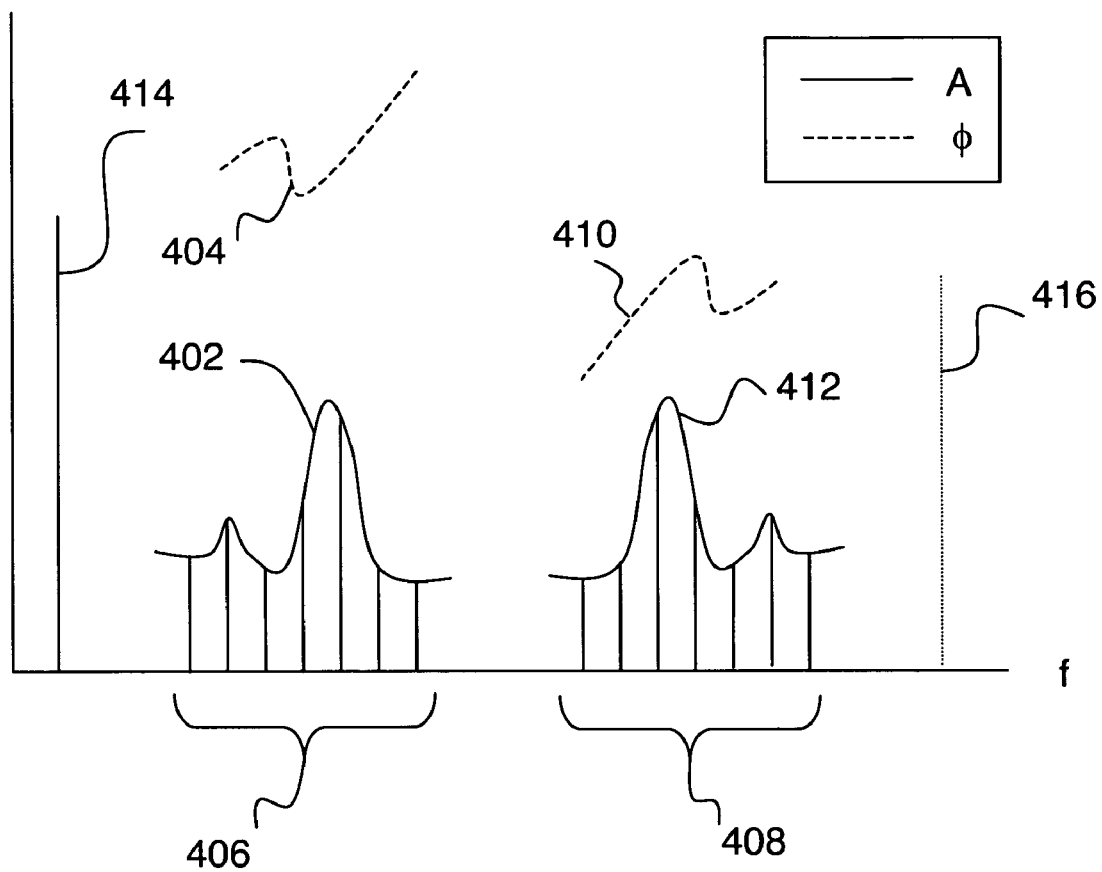
FIG. 4 shows amplitude and phase spectra in accordance with an embodiment of the invention.

For example, as shown on FIG. 4, suppose it is desired to provide an optical filter having an arbitrary passive response h(f) having amplitude response 402 and phase response 404 in a frequency range 406. According to the invention, such a filter can be synthesized by the following steps: 1) Define a discretization of frequency and fractional level density such that frequency range 406 fits within half the frequency period defined by the discrete Fourier transform. This period is the separation between 414 and 416 on FIG. 4. 2) Add a Hermitian complement g(f) to h(f) having amplitude response 412 and phase response 410 in a frequency range 408, such that the total response h(f)+g(f) is Hermitian within the "unit cell" between 414 and 416. 3) calculate v[j]

according to the above discussion to determine a fractional level density providing an approximation to g(f)+h(f).

Figure 5A:
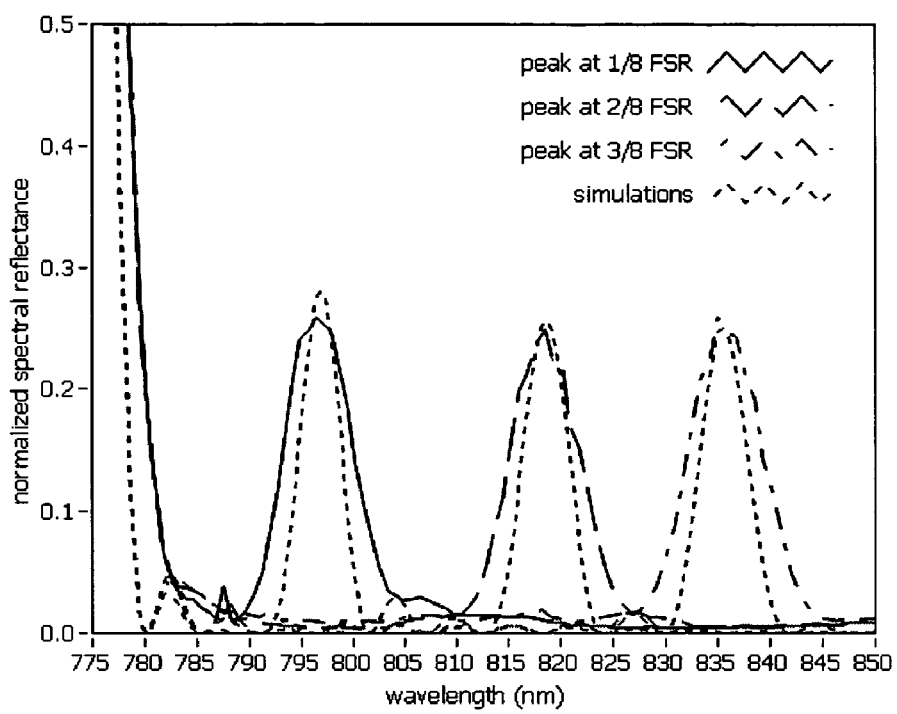
FIGS. 5a–c show spectra of various filters according to embodiments of the invention.
Figure 5B:
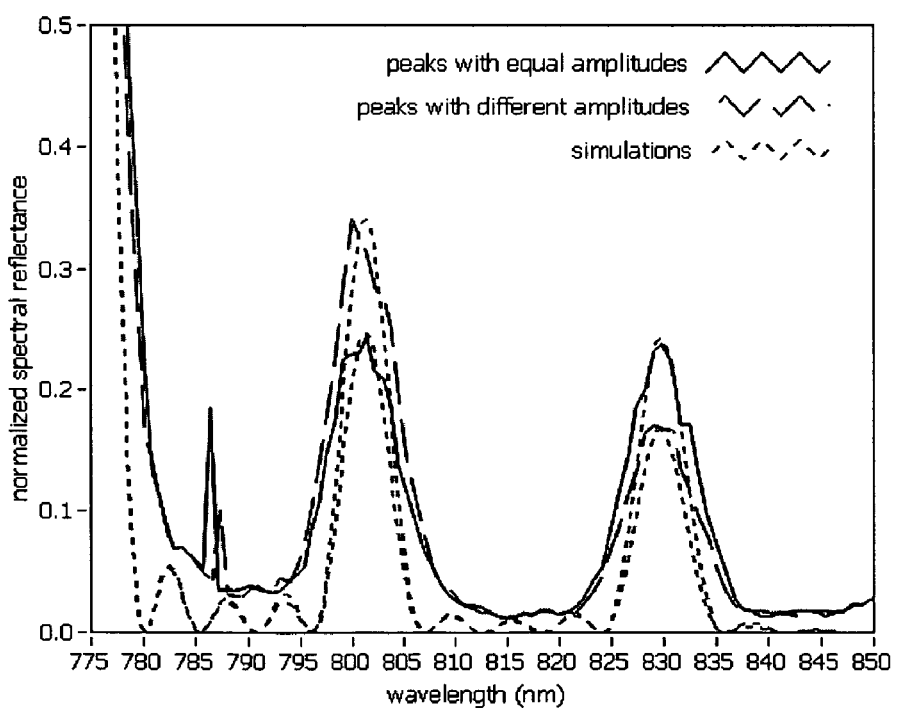
Figure 5C:
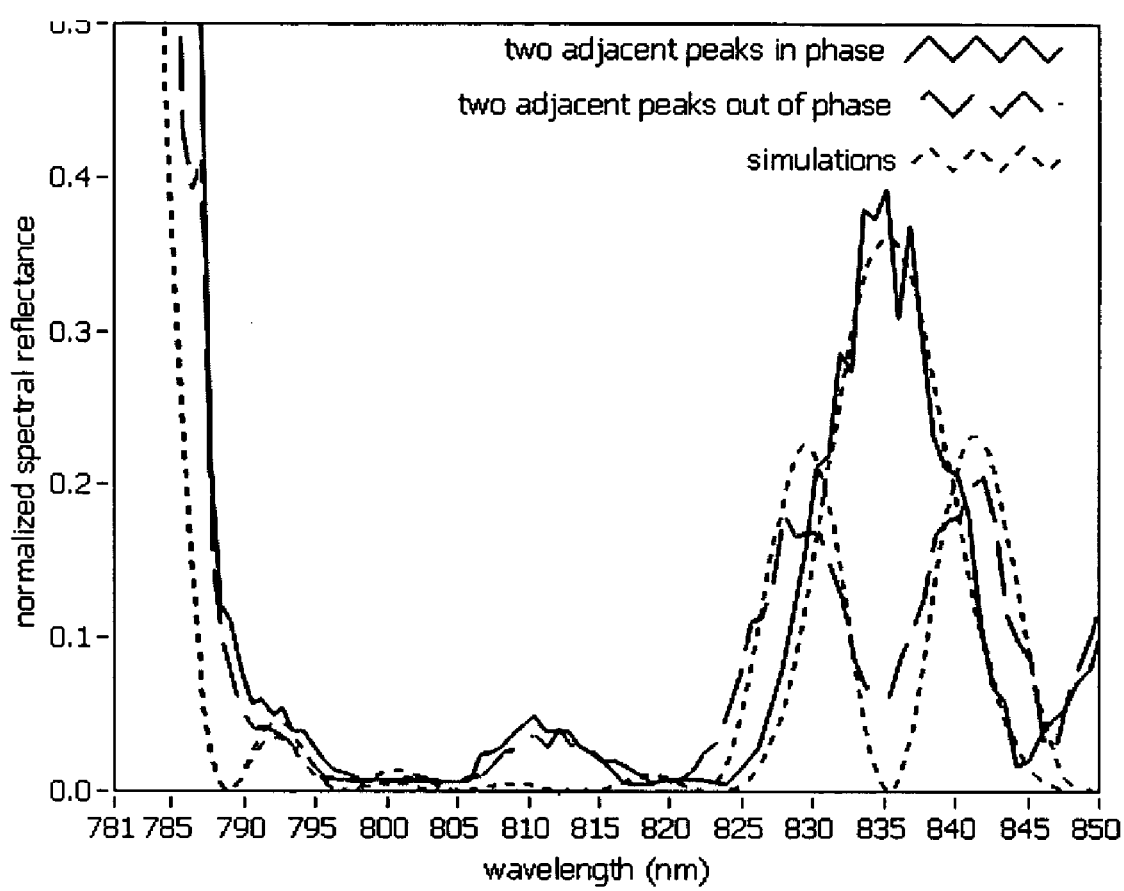

Further examples of filters according to the invention are shown on FIGS. 5a–c. In all three plots, the peak at 775 nm corresponds to the left edge of the free spectral range (FSR), and is always present. FIG. 5a shows that a filter response peak can be placed at a desired spectral location (e.g., ⅛, ⅖ and ⅜ of an FSR away from the 775 nm peak). FIG. 5b shows dual-peak filters having peaks with equal and unequal amplitudes. The sharp features at about 787 nm in FIG. 5b are believed to be experimental artifacts (probably due to triggering errors). FIG. 5c shows dual-peak filters having in-phase and out of phase peaks. In all cases, good agreement is seen between measured results and theoretical modeling. Thus the examples of FIGS. 5a–c clearly illustrate the significant filter design flexibility provided by the present invention.

Such flexibility can be exploited in various ways to design filters. For example, bandpass filters can be provided, which pass one (or more) relatively narrow wavelength band(s). Highpass edge filters can also be provided, which pass wavelengths above an edge wavelength and block wavelengths below the edge wavelength. Similarly, lowpass edge filters are also possible, which block wavelengths above the edge wavelength and pass wavelengths below the edge wavelength. These optical highpass and lowpass edge filters are understood to be highpass or lowpass within a filter working band, since it is usually not necessary for an optical edge filter to pass (or block) extremely short or long wavelengths.

The above description of the invention is illustrative, not restrictive. For example, the illumination of surface 110 is typically not uniform in practice (e.g., Gaussian Beam illumination). The invention may be practiced with non-uniform illumination, since the above description of uniform illumination can be extended to include non-uniform illumination. Alternatively, the above plane-wave description provides a sufficiently accurate approximation in many cases having non-uniform illumination (e.g., illumination by a collimated Gaussian beam).

Various conventions are in use in the art for defining Fourier transforms (e.g., sign/phase conventions and where to place the factor(s) of $2\pi$). Practice of the invention is not affected by such details of convention.

What is claimed is:

1. A method for providing a diffractive optical filter having a far field discrete spectral response C[m] which is a scaled approximation to a Hermitian, passive discrete spectral response B[m], the method comprising:
    a) calculating t[j] such that t[j] and B[m] are a discrete Fourier transform pair;
    b) calculating $t_{min}$ equal to the minimum of t[j];
    c) calculating u[j]=t[j]−$t_{min}$;
    d) calculating D equal to the sum of u[j] for all j;
    e) calculating v[j]=u[j]/D;
    f) setting a discrete fractional level density of said diffractive optical filter substantially equal to v[j];
    whereby C[m]=1 for m=0, and C[m]=B[m]/D for nonzero m, thereby providing said scaled approximation to B[m].

2. The method of claim 1, wherein an area S of said optical filter directs incident light toward a far field aperture and wherein said discrete fractional level density v[j] is a fraction of said area S having a height h[j] relative to a reference surface.

3. The method of claim 1, wherein t[j] is either a discrete Fourier transform of B[m] or an inverse discrete Fourier transform of B[m].

4. The method of claim 1, wherein said optical filter is a bandpass filter, a highpass edge filter, or a lowpass edge filter.

5. The method of claim 1, wherein said optical filter has two or more passbands having substantially equal amplitudes.

6. The method of claim 1, wherein said optical filter has two or more passbands having unequal amplitudes.

7. The method of claim 1, wherein said optical filter has two or more passbands having substantially equal phases.

8. The method of claim 1, wherein said optical filter has two or more passbands having substantially opposite phases.

9. A diffractive optical filter having a far field spectral response C[m] which is a scaled approximation to a Hermitian, passive spectral response B[m], the filter comprising:
    a) a plurality of sets of mirrors, each of said sets indexed by an integer j and having a height h[j] relative to a reference surface; and
    b) an aperture positioned in a diffractive far field of said sets of mirrors;
    wherein, for each of said sets, only $N_j$ of the mirrors in set j are oriented to reflect an incident plane wave substantially in a direction defined by said aperture, wherein $N_{tot}$ is the sum of $N_j$ for all j; and
    wherein $N_j/N_{tot}$ is substantially equal to a function v[j] calculated as follows:
    1) calculating t[j] such that t[j] and B[m] are a discrete Fourier transform pair;
    2) calculating $t_{min}$ equal to the minimum of t[j];
    3) calculating u[j]=t[j]−$t_{min}$;
    4) calculating D equal to the sum of u[j] for all j;
    5) calculating said function v[j]=u[j]/D;
    whereby C[m]=1 for m=0, and C[m]=B[m]/D for nonzero m, thereby providing said scaled approximation to B[m].

10. The optical filter of claim 9, wherein t[j] is either a discrete Fourier transform of B[m] or an inverse discrete Fourier transform of B[m].

11. The optical filter of claim 9, wherein said optical filter is a bandpass filter, a highpass edge filter, or a lowpass edge filter.

12. The optical filter of claim 9, wherein said optical filter has two or more passbands having substantially equal amplitudes.

13. The optical filter of claim 9, wherein said optical filter has two or more passbands having unequal amplitudes.

14. The optical filter of claim 9, wherein said optical filter has two or more passbands having substantially equal phases.

15. The optical filter of claim 9, wherein said optical filter has two or more passbands having substantially opposite phases.

16. The optical filter of claim 9, wherein said mirrors are part of a micromirror array fabricated with micro electro-mechanical systems (MEMS) technology.

17. The optical filter of claim 9, wherein said sets of mirrors are electrically controllable such that $N_j$ for each set j can be set to any value greater than or equal to zero and less than or equal to a maximum value $N_{max}$.

18. The optical filter of claim 9, wherein each of said mirrors is switchable between a first position reflecting incident light substantially toward said aperture and a sec ond position reflecting incident light substantially away from said aperture.

19. The optical filter of claim 9, further comprising a focusing element for forming said diffractive far field.

20. The optical filter of claim 19, wherein said focusing element comprises a lens or a mirror.

21. The optical filter of claim 9, wherein said sets of mirrors are substantially evenly spaced in height by a spacing δh, such that |h[j]−h[j−1]|=δh for all j.

* * * * *